United States Patent
Viccari et al.

(10) Patent No.: US 12,549,449 B2
(45) Date of Patent: Feb. 10, 2026

(54) SYSTEMS AND METHODS FOR SIMULATING SELECTIVE FAULT INJECTIONS INTO A NETWORK INFRASTRUCTURE

(71) Applicant: Stripe, Inc., San Francisco, CA (US)

(72) Inventors: Leonardo Viccari, Seattle, WA (US); Stuart Sandine, Seattle, WA (US); Omar Eltobgy, Seattle, WA (US); Michael Succi, Seattle, WA (US); Sherif Mahmoud, Seattle, WA (US)

(73) Assignee: Stripe, LLC, South San Francisco, CA (US)

( * ) Notice: Subject to any disclaimer, the term of this patent is extended or adjusted under 35 U.S.C. 154(b) by 336 days.

(21) Appl. No.: 18/341,555

(22) Filed: Jun. 26, 2023

(65) Prior Publication Data
US 2024/0430170 A1    Dec. 26, 2024

(51) Int. Cl.
*H04L 12/00* (2006.01)
*H04L 41/06* (2022.01)
*H04L 41/14* (2022.01)
*H04L 41/147* (2022.01)
*H04L 41/22* (2022.01)

(52) U.S. Cl.
CPC ............ *H04L 41/145* (2013.01); *H04L 41/06* (2013.01); *H04L 41/147* (2013.01); *H04L 41/22* (2013.01)

(58) Field of Classification Search
CPC ..... H04L 41/145; H04L 41/06; H04L 41/147; H04L 41/22; H04L 41/0631; H04L 41/0654; H04L 41/065; H04L 41/0659; H04L 41/0677; G06F 11/3696; G06F 8/433; G06F 11/328; G06F 11/0709; G06F 16/26

USPC ........................................................ 370/242
See application file for complete search history.

(56) References Cited

U.S. PATENT DOCUMENTS

| | | | |
|---|---|---|---|
| 9,253,027 B2 * | 2/2016 | Vaidya | H04L 41/0659 |
| 10,454,752 B2 * | 10/2019 | Margalit | G06F 11/34 |
| 10,819,604 B2 * | 10/2020 | Rosh | H04L 43/0817 |
| 11,204,824 B1 * | 12/2021 | Tiwari | G06F 11/0793 |
| 11,265,203 B2 * | 3/2022 | Margalit | G06F 11/0709 |
| 11,550,683 B2 * | 1/2023 | Gautam | G06F 11/26 |

(Continued)

FOREIGN PATENT DOCUMENTS

WO   WO-2021162910 A1 *   8/2021   ......... G06F 16/2428

*Primary Examiner* — Frantz Coby
(74) *Attorney, Agent, or Firm* — Foley & Lardner LLP

(57) ABSTRACT

A system may include a network infrastructure having a set of network component nodes, each network component node configured to communicate with at least one other network component node in accordance with a dependency protocol; and a server in communication with the network infrastructure and a fault injection server. The server can be configured to monitor outputs generated by the network infrastructure and attributes of data communication between the set of network component nodes; execute a computer model using the dependency protocol and the monitored attributes and outputs as input to predict a set of faults; in response to presenting the set of faults for display on a user interface, receive a selection of one or more of the set of faults; and instruct the fault injection server to execute a fault injection scenario simulating performance of the network infrastructure operating under the selected one or more faults.

20 Claims, 10 Drawing Sheets

(56) References Cited

U.S. PATENT DOCUMENTS

| | | | |
|---|---|---|---|
| 11,831,487 B2* | 11/2023 | Shen | H04L 41/0659 |
| 11,947,939 B1* | 4/2024 | Longmore | G06F 8/433 |
| 2014/0192630 A1* | 7/2014 | Vaidya | H04L 41/0677 |
| | | | 370/216 |
| 2015/0033084 A1* | 1/2015 | Sasturkar | H04L 41/22 |
| | | | 714/46 |
| 2019/0306037 A1* | 10/2019 | Rosh | H04L 41/22 |
| 2020/0106659 A1* | 4/2020 | Margalit | H04L 41/065 |
| 2021/0248166 A1* | 8/2021 | Ares | G06F 16/26 |
| 2021/0397497 A1* | 12/2021 | Tiwari | G06N 20/00 |
| 2022/0070050 A1* | 3/2022 | D'Ippolito | H04L 41/0627 |
| 2022/0327037 A1* | 10/2022 | Gautam | G06F 11/3696 |
| 2022/0385526 A1* | 12/2022 | Haugen | H04L 41/0654 |
| 2023/0246902 A1* | 8/2023 | Shen | G06F 11/328 |
| | | | 714/37 |
| 2024/0048437 A1* | 2/2024 | Shen | H04L 41/0631 |

\* cited by examiner

⟵ 400

FAULT 1

Fault type ⟵ 402
[ K8s pod killer fault    ◊ ]

Targeting

| Service 408 ⟵ 404 | Namespace ⟵ 406  410 |
|---|---|
| [ taxengine            ◊ ] | [ horizontax            ] |
| ( Cluster \| northwest ⌄ ) | ( K8s resource \| POD ⌄ ) |

K8s label key ⟵ 412  420  416     K8s label value ⟵ 414     [ Add label ]

| | | |
|---|---|---|
| [ Service 1 ] | [ = ◊ ] | [ taxengine ]  424 |
| [ app ] | [ = ◊ ] | [ taxengine-srv ] |
| [ role ] | [ = ◊ ] | [ taxengine ] |

Only target K8s s that match all the above K8s labels   422 ⟋   418

Pods' percentage ⟵ 426          Pods' count ⟵ 428
[ 100 ]                              [        ]

Randomly target this % or # of pods matching the specified K8s labels

Impact

Termination grace period                    ( Impact type \| POD_KILLER ⌄ )
The time in seconds that K8s wait for the                          ⟵ 432
pod to be terminated gracefully before
sending a SIGKILL signal
                      ⟵ 430
[ 0 ]

FAULT 1

Fault type ⟵502

[ Host fault - Shared MSP ⌄ ]

Targeting

| Service ⟵504 508 | Namespace ⟵506 510 |
|---|---|
| [ horizon-litmus-elected ⌄ ] | [ hznlitmusbox ⌄ ] |
| ( Cluster | NORTHWEST ⌄ ) | ( K8s resource | DEPLOYMENT ⌄ ) |

K8s label key ⟵512 516    K8s label value ⟵514   [ Add label ]

[ Service 1 ]  [ = ⌄ ]  [ horizon-litmus-elected ]   520

[ role ]  [ = ⌄ ]  [ rpc_server ]

Only target K8s DEPLOYMENTs that match all the above K8s labels ⟵518

Pods' percentage ⟵522       Pods' count ⟵524

[ 100 ]                          [           ]

Randomly target this % or # of pods in the selected K8s deployment

Impact

Gremlin command type ⟵526

[ Blackhole ⌄ ]

Hostnames                                    IP Addresses
Only impact traffic to these hostnames.          Only impact traffic to these IP addresses.
Exclude from impact with a leading (^).          Exclude from impact with a leading (^).
Add space or comma after each entry.             Add space or comma after each entry.
Also accepts Consul URLs (i.e. test-srv          Also accepts CIDR (i.e. 10.0.0.0/24)
-grapc.service.consul)                                                              ⟵530

[                                        ]       [                                        ]

Remote Ports                      ⟵528       Local Ports
Only impact outgoing traffic to these            Only impact outgoing traffic from these
remote ports. Exclude from impact with           local ports. Exclude from impact with
a leading (^). Add space or comma after          a leading (^). Add space or comma after
each entry. Also accepts ranges                  each entry. Also accepts ranges
(i.e. 8080-8085)             ⟵532                (i.e. 8080-8085)

[                                        ]       [ 31002                                  ]
                                                                                    ⟵534
Duration
The length of the attack (seconds) ⟵536

FAULT 1

Fault type ⟋602
[ Host fault - Shared MSP ⌄ ]

Targeting

| Service ⟋604  608 | Namespace ⟋606  610 |
|---|---|
| [ horizon-litmus-elected ⌄ ] | [ hznlitmusbox ] |
| ( Cluster | NORTHWEST ⌄ ) | ( K8s resource | DEPLOYMENT ⌄ ) |

K8s label key ⟋612  616     K8s label value ⟋614    [Add label]

[ Service 1 ]   [ = ⌄ ]   [ horizon-litmus-elected ]                 620

[ role ]        [ = ⌄ ]   [ rpc_server ]

Only target K8s DEPLOYMENTs that match all the above K8s labels  ⟍618

Pods' percentage ⟋622        Pods' count ⟋624

[ 100 ]                            [ ]

Randomly target this % or # of pods in the selected K8s deployment

Impact

Gremlin command type ⟋626

[ CPU ⌄ ]

Duration                              CPU Percentage
The length of the attack (seconds) ⟋628   The % of CPU to consume on each core

[ 300 ]                                    [ 80 ]
                                                                    ⟍630
Cores                          634 ⟋ ☐ All cores
The number of CPU core to attack        If set, attack all available cores

[ 1 ]
          ⟍632

Container selection
Target which containers in the selected pods
                                              ⟋636
[ All ⌄ ]

FAULT 1

Fault type ⟋702

[ Request fault ▾ ]

Targeting
708

| Source Service | Destination Consul service ☑ | All destinations |
|---|---|---|
| Service making the requests | Consul service receiving the requests | Target everything; useful for debugging |
| [ rpp-testing ▾ ] | [　　　　　　　] | |
| ⟍704 | ⟍706 | |

Source:

| Horizon container name | Horizon op | Bapi API name |
|---|---|---|
| [ rpp-testing--rpc-serve ] | [　　　　　] | [　　　　　] |

Destination: full URI ⟍712　　⟍714　　⟍716

[　　　　　　　　　]
⟍718

Merchant
Target a specific merchant. Or multiple, comma-separated.

| Token ⟋720 | Cell ⟋722 |
|---|---|
| [　　　　　] | [　　　　　] |

Impact

| Percentage | Duration (ms) | 728⟍☐ Dry run |
|---|---|---|
| Randomly impact this % of requests ⟋724 | How long the fault should run ⟋726 | Do not add latency or error, just log |
| [ 100 ] | [ 120000 ] | |

| Inject gRPC latency (ms) ⟋730 | Inject gRPC error code ⟋732 | Inject HTTP latency (ms) ⟋734 | Inject HTTP error code ⟋736 |
|---|---|---|---|
| [　　　] | [ UNAVAILABL ▾ ] | [　　　] | [　　　] |

FIG. 7

FAULT 1

Fault type ─802

[ Request fault ▾ ]

Targeting

┌─────────────────────────────────────────────────────────────────────────┐
│ Source service         Destination Consul service ─808 ☐ All destinations │
│ Service making the         Consul service receiving the    Target everything;        │
│ requests                   requests                        useful for debugging      │
│                                                                                      │
│ [ rpp-testing      ▾ ]     [ mproxy-grpc        ]                                    │
│         ─804                       ─806                                              │
│                                                                                      │
│ Source:                                                                          │
│ Horizon container name  Horizon op      Bapi API name                    │
│ [ rpp-testing--rpc-serve ]  [            ]      [              ]                     │
│ Destination: full URI ─812     ─814             ─816                             │
│ [                         ]                                                          │
│          ─818                                                                        │
│ Merchant                                                                         │
│ Target a specific merchant. Or multiple, comma-separated.                            │
│ Token         ─820      Cell            ─822                                 │
│ [                      ]    [                       ]                                │
└─────────────────────────────────────────────────────────────────────────┘

Impact

┌─────────────────────────────────────────────────────────────────────────┐
│ Percentage              Duration (ms)  828 ─☐ Dry run                    │
│ Randomly impact this % of   How long the fault should   Do not add latency           │
│ requests          ─824      run              ─826       or error, just log           │
│ [ 100                 ]     [ 120000              ]                                  │
│                                                                                      │
│ Inject gRPC    Inject gRPC   Inject HTTP    Inject HTTP              │
│ latency (ms)─830 error code─832 latency (ms)─834 error code ─836     │
│ [            ]     [ UNAVAILABL ▾ ]  [            ]     [              ]             │
└─────────────────────────────────────────────────────────────────────────┘

FAULT 1

Fault type ╭─902
[ Request fault          ⌄ ]

Targeting
                                              908
┌─────────────────────────────────────────────────────────┐
│ Source service    Destination Consul service  ☐ All destinations │
│ Service making the    Consul service receiving the    Target everything;     │
│ requests              requests                        useful for debugging   │
│ [ rpp-testing    ⌄ ]  [ mproxy-grpc         ]                                │
│         ╰─904                    ╰─906                                       │
│                                                                              │
│ Source:                                                                      │
│ Horizon container name  Horizon op    Bapi API name              │
│ [ rpp-testing--rpc-serve ]  [            ]    [                  ]           │
│ Destination: full URI ╰─912    ╰─914              ╰─916                  │
│ [                        ]                                                   │
│        Merchant  ╰─918                                                   │
│ Target a specific merchant. Or multiple, comma-separated.                    │
│ Token        ╭─920    Cell             ╭─922                         │
│ [              ]          [                  ]                               │
└─────────────────────────────────────────────────────────┘

Impact
                                         928
┌─────────────────────────────────────────────────────────┐
│ Percentage        Duration (ms)    ╲☐ Dry run                    │
│ Randomly impact this % of  How long the fault should   Do not add latency    │
│ requests           ╭─924   run              ╭─926      or error, just log    │
│ [ 100        ]             [ 120000      ]                                   │
│                                                                              │
│ Inject gRPC      Inject gRPC      Inject HTTP   Inject HTTP  │
│ latency (ms)╭─930 error code╭─932 latency (ms)╭─934 error code ╭─936 │
│ [ 100        ]       [ Choose...  ⌄ ]    [              ] [                ] │
└─────────────────────────────────────────────────────────┘

FIG. 9

FAULT 1

Fault type ─1002

[Host fault - Shared MSP ⌄]

Targeting

| Service ─1004 1008 | Namespace ─1006 1010 |
|---|---|
| [horizon-litmus-elected ⌄] | [hznlitmusbox ⌄] |
| (Cluster | NORTHWEST ⌄) | (K8s resource | DEPLOYMENT ⌄) |

K8s label key ─1012 1016    K8s label value ─1014   [Add label]

| service | = ◇ | horizon-litmus-elected | |
|---|---|---|---|
| role | = ◇ | rpc_server | × |

1020

Only target K8s DEPLOYMENTs that match all the above K8s labels    ─1018

Pods' percentage ─1022    Pods' count ─1024

[100]    [ ]

Randomly target this % or # of pods in the selected K8s deployment

Impact

Gremlin command type ─1026

[Blackhole ◇]

Hostnames
Only impact traffic to these hostnames. Exclude from impact with a leading (^). Add space or comma after each entry. Also accepts Consul URLs (i.e. test-srv-grapc.service.consul)

IP Addresses
Only impact traffic to these IP addresses. Exclude from impact with a leading (^). Add space or comma after each entry. Also accepts CIDR (i.e. 10.0.0.0/24)

─1030

[ ]    [ ]

Remote Ports ─1028    Local Ports
Only impact outgoing traffic to these remote ports. Exclude from impact with a leading (^). Add space or comma after each entry. Also accepts ranges (i.e. 8080-8085)    ─1032

Only impact outgoing traffic from these local ports. Exclude from impact with a leading (^). Add space or comma after each entry. Also accepts ranges (i.e. 8080-8085)

[ ]    [31002]

─1034

Duration
The length of the attack (seconds) ─1036

SYSTEMS AND METHODS FOR SIMULATING SELECTIVE FAULT INJECTIONS INTO A NETWORK INFRASTRUCTURE

TECHNICAL FIELD

This application relates generally to methods and systems for simulating selective fault injections into a network infrastructure.

BACKGROUND

In modern computer systems, network services can play a vital role in ensuring the availability and performance of applications and services. To maintain high reliability, it is important to continually test and verify the infrastructure's ability to handle faults and failures. Conventionally, this process has been time-consuming and often requires human intervention to identify and inject faults into a system. Such approaches can suffer from several limitations. The approaches are often error-prone, inefficient, and do not scale well with the complexity of modern network environments.

SUMMARY

A service owner may seek to test the reliability of a network infrastructure on which a service operates. The service may use various chaos scenarios to inject infrastructure and request-based faults during runtime on the service. To monitor the chaos scenarios, the service owner may have to have a deep understanding of all parts of their service and the network infrastructure on which the service operates as well as knowledge of dependencies within the network infrastructure or service (e.g., how often a dependency is called, what is the transaction pattern, etc.). While some service owners may have the capabilities to effectively execute chaos scenarios for their services, many service owners may not have such capabilities or may be able to effectively run chaos scenarios for some services and not others. Service owners may also have to manually configure the different faults and latencies to be injected, the injection points, how often the faults will be injected, how long the faults will last, etc.

For the aforementioned reasons, there is a need for an automated solution that can infer and inject service faults into a network infrastructure for a service based on a service profile of the network infrastructure.

Using the systems and methods described herein, a computing device can automatically determine what, when, and where to simulate fault injections for a network infrastructure. For example, a computing device can execute an application to scan a network infrastructure of a service running on top of the network infrastructure. In doing so, the computing device can scan the network infrastructure for metadata about the infrastructure as well as historical request data between the service and dependencies indicating relationships between different network component nodes of the network infrastructure. The computing device can collect data and attributes of data communication between the different network component nodes based on the scan. Based on the data and attributes, the computing device can automatically suggest or recommend a set of faults for a fault injection scenario (e.g., a chaos scenario). The computing device can suggest or recommend the set of faults for the fault injection scenario with configured parameters (e.g., fault characteristics) for the network infrastructure already filled in. In doing so, the computing device can perform more comprehensive tests of the network infrastructure with increased reliability and relevance of the results of the tests.

To determine a set of faults, the computing device can execute a computer model (e.g., a machine learning model). The computer model may be trained to output different faults (e.g., different fault recommendations) based on attributes of data communication or outputs of a network infrastructure. The computing device can monitor outputs and data communication between network component nodes of a network infrastructure. The computing device can store a dependency protocol (e.g., a dependency mapping) for the network infrastructure that indicates the relationships between the different network component nodes. The computing device can input the dependency protocol and the attributes or outputs that the computer model obtained from monitoring the network infrastructure into the computer model. The computing device can execute the computer model and the computer model can output a set of faults for a fault scenario based on the input. Accordingly, the computing device can automatically determine faults for a fault scenario that has been uniquely determined for the network infrastructure to determine points of vulnerability or points of potential improvement in the network infrastructure.

In some embodiments, a system includes a network infrastructure having a set of network component nodes, each network component node can be configured to communicate with at least one other network component node in accordance with a dependency protocol indicating relationships between the set of network component nodes; and a server in communication with the network infrastructure and a fault injection server. The server can be configured to monitor outputs generated by the network infrastructure and attributes of data communication between the set of network component nodes; execute a computer model using the dependency protocol, the monitored attributes, and the monitored outputs as input to predict a set of faults; in response to presenting the set of faults for display on a user interface, receive a selection of one or more of the set of faults; and instruct the fault injection server to execute a fault injection scenario simulating performance of the network infrastructure operating under the selected one or more faults.

In some embodiments, a method includes monitoring, by a server in communication with a fault injection server and a network infrastructure having a set of network component nodes, outputs generated by the network infrastructure and attributes of data communication between network component nodes of the set of network component nodes, each network component node configured to communicate with at least one other network component node in accordance with a dependency protocol indicating relationships between the set of network component nodes; executing, by the server, a computer model using the dependency protocol, the monitored attributes, and the monitored outputs as input to predict a set of faults; in response to presenting the set of faults for display on a user interface, receiving, by the server, a selection of one or more of the set of faults; and instructing, by the server, the fault injection server to execute a fault injection scenario simulating performance of the network infrastructure operating under the selected one or more faults.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

FIGS. 3-10 illustrate example user interfaces illustrating configurations for different faults that can be injected into network infrastructures, according to an embodiment.

DETAILED DESCRIPTION

Figure 1:
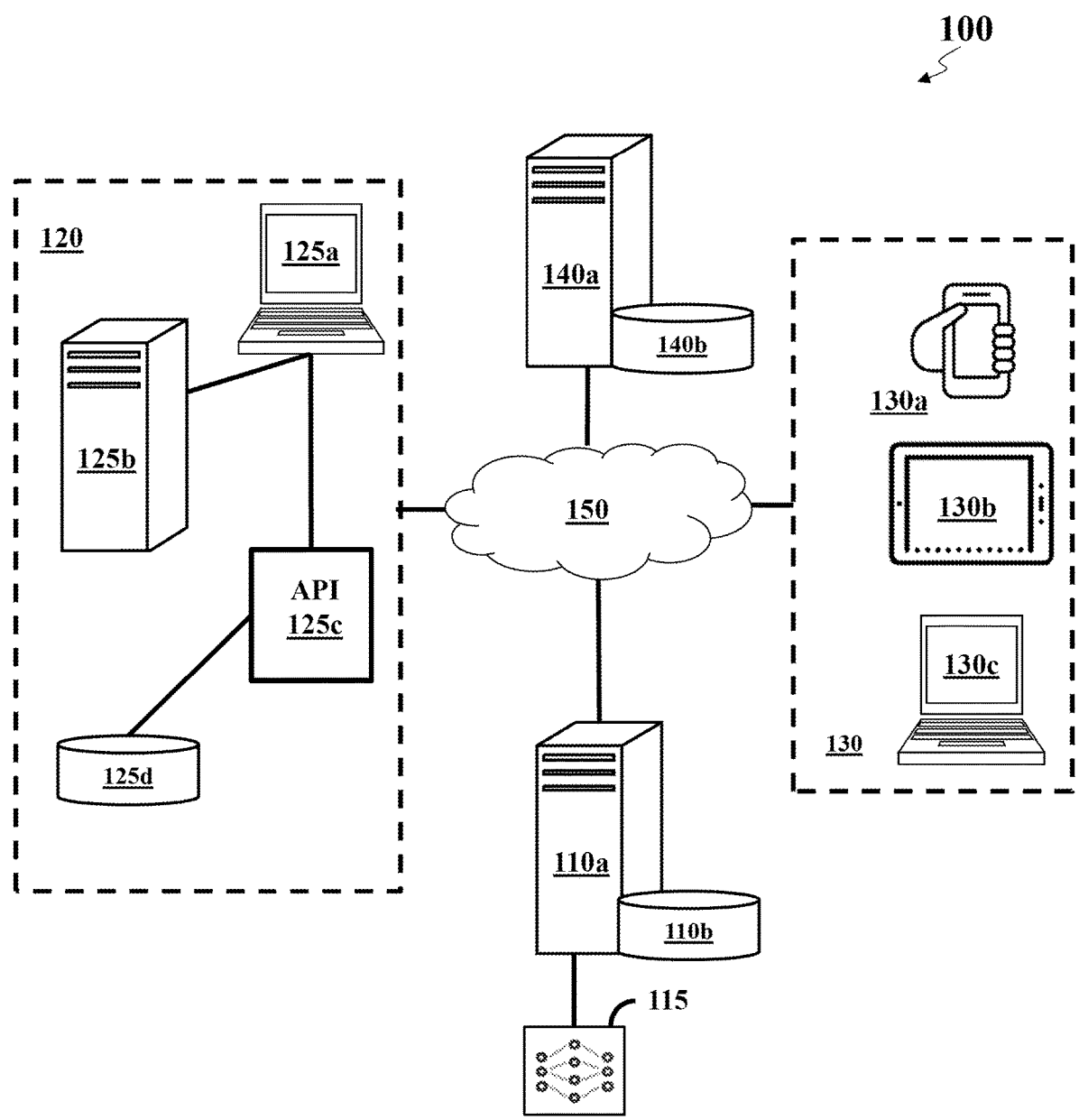
FIG. 1 illustrates a computing system for simulating selective fault injections into a network infrastructure, according to one or more embodiments.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

FIG. 1 is a non-limiting example of components of a fault simulation injection system 100 in which an analytics server 110a operates. The analytics server 110a may utilize features described in FIG. 1 to retrieve data and generate/display results, such as via a platform displayed on various devices. The analytics server 110a may be communicatively coupled to a system database 110b, a network infrastructure 120 containing network component nodes 125a-d (collectively network component nodes 125), user devices 130a-c (collectively user devices 130), and a fault injection server 140a communicatively coupled to a fault database 140b. The analytics server 110a can monitor the network infrastructure 120 to identify outputs and attributes of the network infrastructure 120. The analytics server 110a can execute a computer model 115 using the identified outputs and attributes as input to automatically determine faults for which to simulate injection into the network infrastructure 120 to test performance of the network infrastructure 120. The system 100 is not confined to the components described herein and may include additional or other components not shown for brevity, which are to be considered within the scope of the embodiments described herein.

The above-mentioned components may be connected to each other through a network 150. The examples of the network 150 may include, but are not limited to, private or public LAN, WLAN, MAN, WAN, and the Internet. The network 150 may include both wired and wireless communications according to one or more standards and/or via one or more transport mediums.

The communication over the network 150 may be performed in accordance with various communication protocols such as Transmission Control Protocol and Internet Protocol (TCP/IP), User Datagram Protocol (UDP), and IEEE communication protocols. In one example, the network 150 may include wireless communications according to Bluetooth specification sets or another standard or proprietary wireless communication protocol. In another example, the network 150 may also include communications over a cellular network, including, e.g., a GSM (Global System for Mobile Communications), CDMA (Code Division Multiple Access), and/or EDGE (Enhanced Data for Global Evolution) network.

The analytics server 110a may generate and display an electronic platform (e.g., a fault simulation platform that is sometimes referred to as a platform) on any device discussed herein. The platform may be configured to receive requests for recommendations of fault simulations to run on a network infrastructure and automatically output sets of faults in response to such requests. For instance, the electronic platform may include one or more graphical user interfaces (GUIs) displayed on the user device 130. Examples of such graphical user interfaces are depicted in FIGS. 3-10. The graphical user interfaces depicted in FIGS. 3-10 illustrate different modifiable configurations (e.g., modifiable fault characteristics) of faults. An example of the platform generated and hosted by the analytics server 110a may be a web-based application or a website configured to be displayed on various electronic devices, such as mobile devices, tablets, personal computers, and the like. The platform may include various input elements configured to receive a response from any of the users and display any results necessary during execution of the methods discussed herein. The analytics server 110a may monitor network infrastructures and automatically select faults for simulation based on the monitoring. The analytics server 110a can select faults for simulation (e.g., injection into a network infrastructure during run-time) using the computer model 115.

The analytics server 110a may be any computing device comprising a processor and non-transitory, machine-readable storage capable of executing the various tasks and processes described herein. The analytics server 110a may employ various processors such as a central processing unit (CPU) and graphics processing unit (GPU), among others. Non-limiting examples of such computing devices may include workstation computers, laptop computers, server computers, and the like. While the system 100 includes a single analytics server 110a, the analytics server 110a may include any number of computing devices operating in a distributed computing environment, such as a cloud environment.

The network infrastructure 120 may be or include any number of network component nodes 125. The network component nodes 125 can be or include one or more hosts or end devices, routers, switches, firewalls, load balancers Domain Name System servers, proxy servers, storage nodes, virtual machines, monitoring nodes, etc. Each network component node 125 may include one or more computing devices comprising a processor and non-transitory, machine-readable storage capable of executing the various tasks and processes needed to monitor and collect data. The network component nodes 125 may also comprise other computing components than servers. The network component nodes 125 can communicate with each other, such as over the network 150 or a network similar to the network 150. The different nodes can operate together to host and/or support a service or application for a service provider, such as different applications, application programming interfaces, websites or web applications, etc. Each network component node 125 of the network infrastructure 120 can have a dedicated role in hosting the service or application for the service provider. The service or application can be used internally by the service provider that owns or manages the network infrastructure 120 (e.g., the network infrastructure 120 can manage accounting software for the service provider) or can host or manage a public-facing service or application, such as a software-as-a-service system. The network infrastructure 120 can be a cluster of computing devices or nodes, such as a Kubernetes cluster.

As illustrated by lines between the network component nodes 125 depicted in FIG. 1, the network component nodes 125 can have relationships or dependencies with each other. Dependencies of a network infrastructure can refer to components, systems, or services of the various network component nodes 125 that rely on each other or communicate with each other in some manner for proper functioning. Dependencies can ensure that the network infrastructure operates efficiently and delivers the intended services. Examples of dependencies within the network infrastructure 120 include, but are not limited to, hardware dependencies, software dependencies, connectivity dependencies, power dependencies, network services dependencies, security dependencies, application dependencies, and maintenance and support dependencies. Maintaining an accurate status of the different dependencies between network component nodes can ensure that any changes or disruptions in one network component node does not negatively impact the overall functionality of the network infrastructure 120.

User devices 130 may be any computing device comprising a processor and a non-transitory, machine-readable storage medium capable of performing the various tasks and processes described herein. Non-limiting examples of a user device 130 may be a workstation computer, laptop computer, phone, tablet computer, and server computer. During operation, various users may use one or more of the user devices 130 to access the platform operationally managed by the analytics server 110a. Even though referred to herein as "user" devices, these devices may not always be operated by users. For instance, a tablet 130c may be used by a service owner that is seeking to test the reliability of the network infrastructure 120 if different faults were to occur.

Through the platform, the analytics server 110a can receive a request to execute a fault injection scenario for the network infrastructure 120. The analytics server 110a can monitor the network infrastructure 120 for outputs and attributes (e.g., latency, round-trip time, bandwidth, reliability, scalability, security, compatibility, error detection and correction, quality of service, a number of abstraction layers, whether the network infrastructure is a micro or macro service, an attribute of a single-point-of-failure associated with the network infrastructure, a network data packet loss, or a number of network component nodes within the network infrastructure, etc.) of data communication between the network component nodes 125. In some cases, the analytics server 110a can determine a dependency protocol for the network infrastructure 120 based on the monitoring. The dependency protocol can indicate and/or be a mapping of the relationships between the different network component nodes 125. The analytics server 110a can determine the dependency protocol of the network infrastructure 120 based on the messages that are transmitted between the network component nodes 125, for example. The analytics server 110a can receive the request to execute a fault injection scenario for the network infrastructure 120 from the user device 130. In response to receiving the request, the analytics server 110a can execute the computer model 115 (which can be stored in the system database 110b) using the data collected (e.g., the outputs, attributes, and dependency protocol) by monitoring the network infrastructure 120. The computer model 115 can output one or more identifications of faults based on the input data and the execution. In some case, the computer model 115 can output different durations, severities, or identifications of network component nodes (e.g., fault characteristics) to be affected by the faults associated with the identifications of faults. The analytics server 110a can identify the identifications and transmit the identifications to the fault injection server 140a. In some cases, the analytics server 110a may transmit the identifications to the fault injection server 140a after the analytics server 110a presents the identifications to the requesting user device 130 and receives an input from the requesting user device 130 to simulate the faults identified by the identifications.

The computer model 115 can be a neural network, a random forest, a support vector machine, a regression model, a recurrent model, etc.). The computer model 115 can be trained by the analytics server 110a or another computing device. The computer model 115 can be trained using a training dataset corresponding to monitored data associated with training network infrastructures, such as using a supervised learning method. For example, the analytics server 110a may monitor different network infrastructures over time. In monitoring the network infrastructures, the analytics server 110a can collect outputs, attributes, and dependency or relationship data for the different network infrastructures. A reviewer (e.g., a human reviewer or a computer reviewer) can review or analyze the monitored data for the different network infrastructures. The analytics server 110a can generate a feature vector from the monitored data and the reviewer can label the feature vector with identifications indicating the correct faults (e.g., the ground truth) to recommend for the different network infrastructures. In some cases, the reviewer can label the feature vector with fault characteristics for the correct faults. The analytics server 110a can generate a training dataset from each of the labeled feature vectors. The analytics server 110a can feed the training dataset into the computer model 115. In doing so, the analytics server 110a can train the computer model 115 by adjusting weights or parameters of the computer model 115 using backpropagation techniques according to a loss function. The analytics server 110a can deploy (e.g., begin using) the computer model 115 upon determining the computer model 115 is accurate to an accuracy threshold. In some cases, a remote computer can train the computer model 115 using similar techniques and/or data. The remote computer can transmit the computer model 115 (e.g., as a binary file) responsive to determining the computer model 115 is accurate to an accuracy threshold.

The fault injection server 140a may be or include a computing device that is configured to represent a computing device operated by a system administrator. The fault injection server 140a can be configured with software that can simulate injecting faults into different network infrastructures based on attributes and/or dependencies of the network infrastructures. The fault injection server 140a can store data for simulation of different faults. The different faults can relate or correspond to communication latency, communication duration, communication cadence, or a communication timing. For instance, the fault injection server 140a can simulate a fault at the network infrastructure 120 by injecting latency into communication from or between a network component node 125 and a database network component node 125 of the network infrastructure. In another instance, the fault injection server 140*a* can simulate a fault at the network infrastructure 120 by deactivating a leader network component node of the network component nodes 125. The fault injection server 140*a* can store and simulate faults of any type to measure the impact that such faults would have on the network infrastructure 120. The fault injection server 140*a* can inject faults at different degrees of severity (e.g., increase central processing unit by varying percentages or increase or decrease latency by different percentages) and/or for varying lengths of time.

In some cases, the faults can correspond or relate to a criticality value of at least one network component node 125 within the network infrastructure 120. A criticality value can be a value or level of importance or severity to the network infrastructure for a particular network component node 125. For example, a fault can indicate to inject latency or deactivate a network component node 125 of the network infrastructure 120 that has a particular criticality value. The fault injection server 140*a* can identify the criticality values of the network component nodes 125 of the network infrastructure 120 and apply the fault at least to the network component node 125 that corresponds to the criticality value. The fault injection server 140*a* or the analytics server 110*a* can monitor the network infrastructure 120 based on the application of the fault to determine the effects of the fault.

The fault injection server 140*a* can store the data for the different faults in a fault database 140*b*. The fault database 140*b* can be a relational database or a database similar to the system database 110*b*. The fault database 140*b* can store the identifications of faults within files or with other executable code that respectively correspond to the faults. The fault injection server 140*a* can receive identifications of a set of faults from the analytics server 110*a*. Upon receipt of the identifications of the set of faults, the analytics server 110*a* can use the identifications to query the fault database 140*b*. The fault injection server 140*a* can retrieve the code or files for the faults that correspond to the identifications of the set of faults from the fault database 140*b*. The fault injection server 140*a* can execute the retrieved code or files to simulate the faults at the network infrastructure 120.

Figure 2:
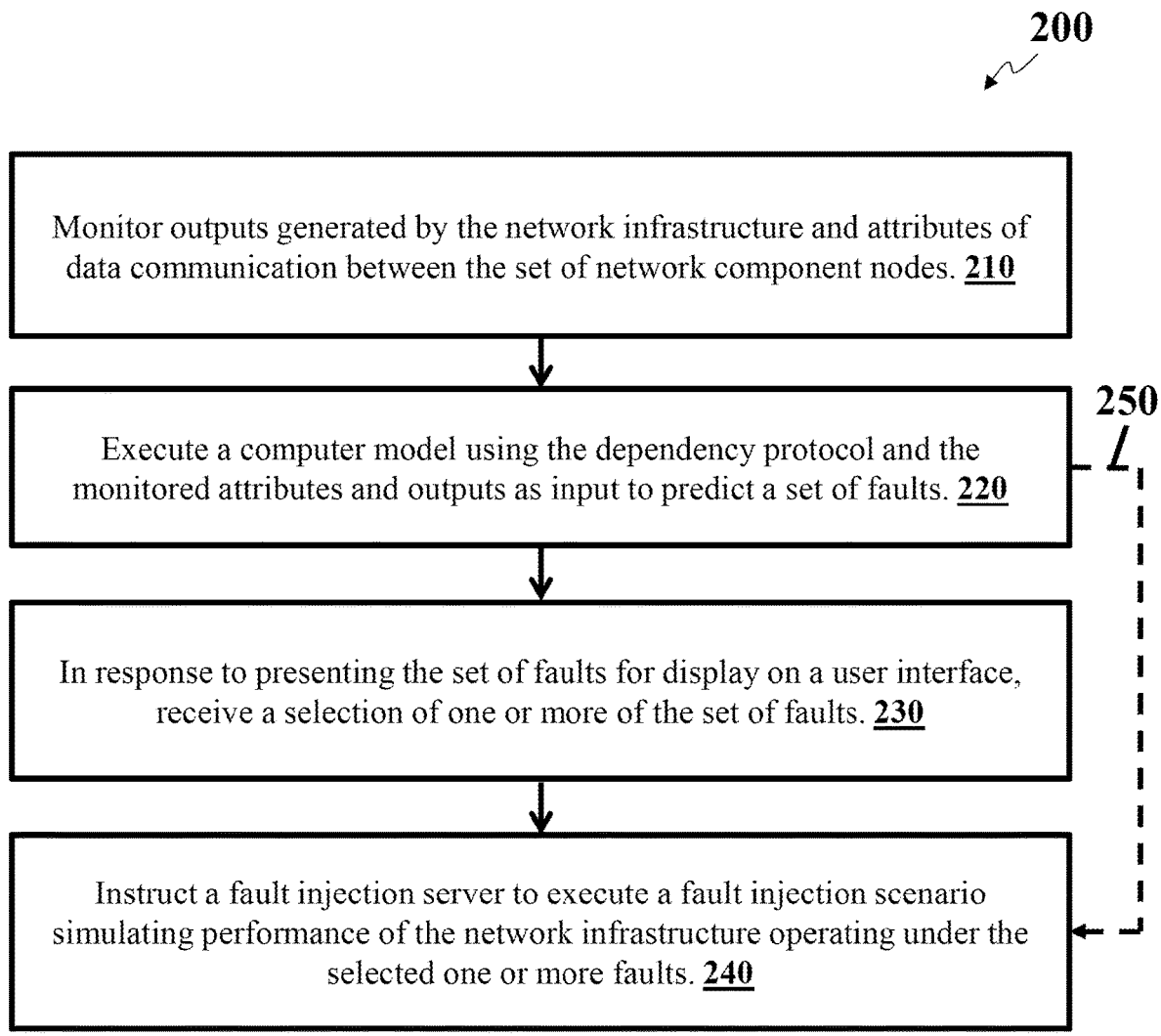
FIG. 2 illustrates a flowchart depicting operational steps for simulating selective fault injections into a network infrastructure, according to an embodiment.
Figure 3:
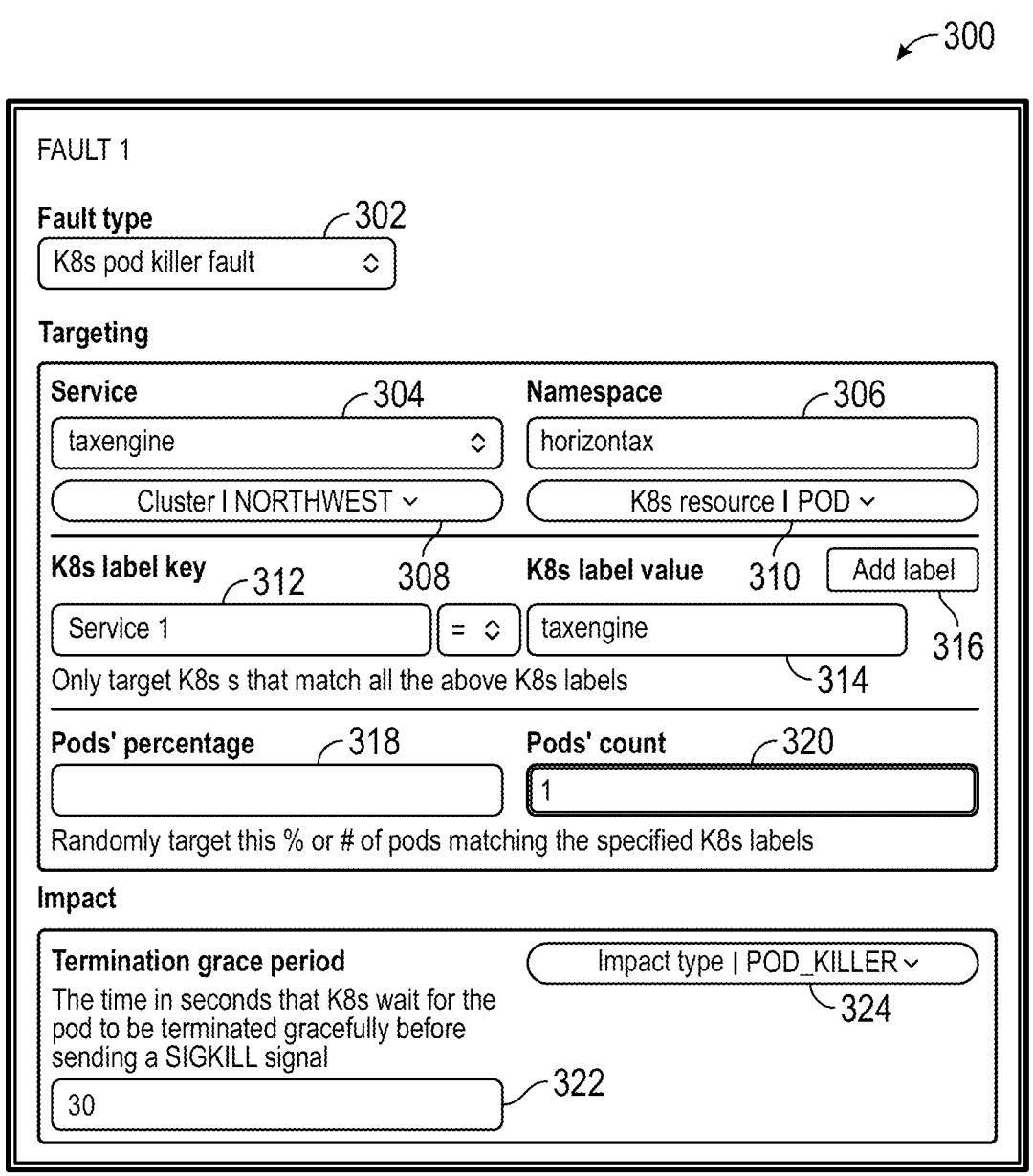

FIG. 2 illustrates a flow diagram of a process executed in an intelligent data verification system, according to an embodiment. The method 200 includes steps 210-240. However, other embodiments may include additional or alternative execution steps, or may omit one or more steps altogether. The method 200 is described as being executed by a server, similar to the analytics server described in FIG. 1. However, one or more steps of method 200 may also be executed by any number of computing devices operating in the distributed computing system described in FIG. 1. For instance, one or more computing devices (e.g., user devices) may locally perform part or all of the steps described in FIG. 2. Moreover, one or more of the steps of the method 200 can be performed via any processor of the system, such as any processor the system 100.

Using the methods and systems described herein, such as the method 200, the analytics server may automatically determine which faults to simulate on a network infrastructure (e.g., a cluster of computing devices configured to host a service or application) to accurately identify problems or points of vulnerability in the network infrastructure. The analytics server may provide fault recommendations that are specific to individual network infrastructures, such as by providing the recommendations based on monitored data from the individual network infrastructures. A fault injection server may identify the recommended fault recommendations for a network infrastructure from the analytics server and simulate the recommended faults at the network infrastructure.

At step 210, the analytics server may monitor a network infrastructure. The network infrastructure can include a set of network component nodes that are configured to communicate between each other (e.g., individual network component nodes of the set may be configured to communicate with at least one other network component node within the set of network component nodes). The analytics server may monitor the network infrastructure as the network infrastructure operates to host a service or application. In monitoring the network infrastructure, the analytics server may monitor outputs generated by the network infrastructure and attributes of data communication between the set of network component nodes. The outputs may be any data packets that network component nodes transmit to an outside client device, or the content of data packets transmitted between network component nodes of the network infrastructure. An example of an output is an analytics value output by a service, such as fraud prediction outputs, sales prediction outputs, inventory analytical outputs, lift predictions for different sales strategies, etc. The attributes may be one or more of latency, round-trip time, bandwidth, reliability, scalability, security, compatibility, error detection and correction, quality of service, a number of abstraction layers, whether the network infrastructure is a micro or macro service, an attribute of a single-point-of-failure associated with the network infrastructure, a network data packet loss, a number of network component nodes within the network infrastructure, etc.

The analytics server may monitor the network infrastructure using network monitoring equipment, such as a probe that is configured to analyze data packets that are transmitted between different network component nodes of the network infrastructure. The probe may collect the data packets from the network through which the network component nodes communicate. In one example, the probe may intercept data packets in transmission through the network, copy the data packets, and transmit the data packets to the intended recipient. The probe may transmit the copies of the data packets to the analytics server for further processing, such as to determine a fault scenario to test potential vulnerabilities in the analytics server.

The analytics server can monitor the network infrastructure to determine a dependency protocol for the network infrastructure. A dependency protocol can be a relationship graph or a set of relationships between different network component nodes of the network infrastructure. The relationships may be indications that different nodes of the network infrastructure rely on each other to function correctly (e.g., for one network component node to correctly operate the network component node may require the services or resources of another network component node). Other examples of relationships of a dependency protocol of the network infrastructure include, but are not limited to, parent-child relationships, producer-consumer relationships, leader-follower relationships, principal-agent relationships, peer-to-peer relationships, client-server relationships, etc. The analytics server may determine such relationships by analyzing the interactions between the different network component nodes and/or the messages that the network component nodes transmit between each other and/or in response to receiving a message from another network component node. In one example, the analytics server can determine a principal-agent relationship upon detecting an instruction message from one network component node to another network component node that the receiving network component follows.

The analytics server may monitor the network infrastructure in response to a request from a client device associated with a service provider of the network infrastructure. For example, a user accessing the client device may manage a service provided by a network infrastructure including a set of network component nodes. The analytics server may detect the messages that the different network component nodes of the set transmit between each other. The analytics server may determine different attributes of the messages such as by identifying the transmission and response times and other characteristics regarding the messages. The analytics server may similarly identify the outputs of the network component nodes (e.g., the outputs to external computing devices outside the network infrastructure, such as a customer computing device) and the relationships of a dependency protocol (e.g., a dependency mapping) for the network infrastructure.

In some embodiments, the analytics server may receive attributes, outputs, and/or a dependency protocol or relationships of a dependency protocol as input by a user. For example, the analytics server may provide a user interface for a platform to the client device associated with the network infrastructure. The user interface may include various forms to which a user of the client device can provide input. The user can input different data regarding the network infrastructure such as the attributes, outputs, the dependency protocol of the network infrastructure, and/or relationships of the dependency protocol into the user interface. In some cases, the user can input different configurations (e.g., a network topology, internet protocol addressing, routing and switching, virtual local area networks (VLAN) and local area network (LAN) segmentation, security settings, quality of service, network services and protocol configurations, monitoring and management configurations, etc.) of the network infrastructure into the user interface. The client device can transmit such inputs to the analytics server and the analytic server can store the inputs in memory.

The client device can transmit a request for fault recommendations to the analytics server. The client device can include any inputs (e.g., network infrastructure identification, relationships, attributes, outputs, etc.) in the request. Responsive to receiving the request, the analytics server may retrieve any monitored data regarding the network infrastructure identified in the request from memory to use to determine fault recommendations for the network infrastructure.

At step 220, the analytics server may execute a computer model. The computer model can be a machine learning model. The analytics server can execute the computer model automatically or based on a user input. The analytics server may execute the computer model using the dependency protocol (e.g., relationships and/or types of relationships of network component nodes of the dependency protocol) and the monitored attributes and outputs as input. For example, the analytics server may create a feature vector using the outputs, relationships of the dependency protocol for the network infrastructure, and the attributes of the data communication between network component nodes of the network infrastructure as input. The computer model may output a set of faults and, in some cases, fault characteristics for the set of faults based on the execution. The output set of faults and fault characteristics may be faults to recommend simulating to detect vulnerabilities in the network infrastructure.

In some cases, the analytics server can include configurations (e.g., a network topology, internet protocol addressing, routing and switching, VLAN and LAN segmentation, security settings, quality of service, network services and protocol configurations, monitoring and management configurations, etc.) of the network infrastructure in the feature vector that is input into the computer model. For example, the analytics server can present, at the client device, a user interface comprising one or more forms for inputting one or more configurations of the network infrastructure. The analytics server can receive, from the client device, a set of configurations input into the one or more forms. The analytics server can receive the set of configurations in the request for fault recommendations for the network infrastructure. The analytics server can include one or more of the configurations (e.g., identifications of the one or more configurations) in the feature vector that is input into the computer model. In some cases, the analytics server can retrieve the configurations of the network infrastructure from memory. The analytics server can execute the computer model, automatically or based on a user input, using the feature vector including the one or more configurations as input.

In some cases, the analytics server can use historical request data to determine fault recommendations for the network infrastructure. Historical request data can include data indicating performance of the network infrastructure under one or more prior tests. Historical request data can include information about requests made by the infrastructure under previous tests or fault simulations, such as the HTTP method used, request headers, request payload or parameters, and/or the endpoint or URL being called. Historical request data can further include response details, such as details about the responses received from the dependencies, including response codes (e.g., HTTP status codes), response headers, response payloads, and any error or exception messages. Historical request data can further include timing and latency data, such as timestamps or duration measurements indicating when requests were sent and when responses were received. Historical request data can further include success or failure indicators that indicate whether the requests were successful or if any errors or failures occurred during the communication. Historical request data can further include request frequency and volume that indicate the frequency of requests made to the dependencies, the number of requests sent over a given period, and any patterns or fluctuations in the request volume. The analytics server can receive such details as input from the client device or from another computing device (e.g., a fault injection server) that has previously tested the network infrastructure in the past. The analytics server can store such data in memory and retrieve the data to include in the feature vector to use as input into the computer model.

The set of faults can include different types of faults. For instance, the set of faults can include timing-related faults, which can correspond to a communication latency, a communication duration, a communication cadence, a communication timing, etc., and/or non-timing related faults, which can correspond to an unexpected termination, exceptions, general failures, communication errors, etc. A fault can be a sudden increase (e.g., a sudden increase by a defined value) in any of the above attributes of communication between all or a selection of the network component nodes of the network infrastructure. For example, a fault can be an increase in latency in communication with a specific network component node, such as the latency in communication with a database. Another example of a fault is the deactivation of a leader network component node of the set of network component nodes. In some cases, the set of faults can include injecting an artificial error (e.g., a "Requested Resource Not Found" error or any other errors) into the network infrastructure. The errors can be injected into messages communicated between network component nodes of the network infrastructure.

The set of faults can correspond to a criticality value. For example, different network component nodes within the network infrastructure can correspond to different criticality values. The criticality values can indicate an importance of the respective network component nodes within the network infrastructure. The analytics server can determine the criticality values for one or more (e.g., all) of the network component nodes based on the monitored data (e.g., based on the number of messages the different network component nodes transmit between each other). In some cases, higher number of messages received and/or transmitted can correspond to a higher criticality value. One or more (e.g., all) of the criticality values can be input at the client device that transmitted the request. A fault of the set of faults can include a fault to deactivate a network component node with a particular criticality value or network component nodes that have a range of network criticality values.

The computer model can be trained using a training dataset. For example, the analytics server can collect monitored data from different network infrastructures (e.g., training network infrastructures). The analytics server can additionally or instead collect network infrastructure configuration data and/or dependency protocol data for the network infrastructures. The analytic server can additionally or instead collect historical request data for the network infrastructures. A reviewer (e.g., a human reviewer or a computer reviewer) can review the collected data and determine potential vulnerabilities in different network infrastructures based on the monitored data. The reviewer can determine different tests or faults that could be applied to the network infrastructures to determine if potential vulnerabilities are correct or not. The reviewer can label datasets of monitored data from the different network infrastructures with the different faults (e.g., the ground truth). In some cases, the reviewer can label the datasets with fault characteristics (e.g., duration, length, severity, impacted nodes, etc.) for the labeled faults. The analytics server (or a different computer, in some cases) can input the different datasets into the computer model. The analytics server can execute the computer model and adjust the weights and/or parameters of the computer model using backpropagation techniques and/or a loss function to train the computer model. Accordingly, the analytics server can train the computer model to automatically predict faults to test specific network infrastructures.

The computer model may be trained to output a defined number of identifications of faults or any number of faults that satisfy a condition. For example, the computer may be trained to output confidence scores for different potential faults based on input feature vectors of data for a network infrastructure. The computer model can compare the confidence scores and select the defined number of identifications of faults with the highest confidence scores to output as recommended faults. In another example, the computer model can compare such confidence scores to a threshold. The computer model can output any recommended faults that exceed the confidence threshold. In some cases, the computer model can output a number of faults up to a defined number with confidence scores that exceed the threshold.

At step 230 the analytics server may receive a selection of one or more of the set of faults. The analytics server can receive the selection in response to presenting the set of faults on a user interface of the client device associated with the network infrastructure. For example, the analytics server can receive the output identifications of faults from the computer model as a set of faults. The analytics server can transmit a message to the client device that requested the recommendations to present the set of faults at the client device. The message can include one or more user interfaces that each include fault characteristics of a fault output by the computer model. Examples of such user faces are shown in FIGS. 3-10. A user at the client device can select (e.g., via an input/output device) one or more of the set of faults from the user interface. The client device can transmit indications of the selected one or more faults to the analytics server. The analytics server can receive the indications of the selected one or more faults.

At step 240, the analytics server may instruct a fault injection server to execute a fault injection scenario. A fault injection scenario can be a simulation (e.g., injection of faults during run-time) of a network infrastructure experiencing one or more faults. The fault injection server can be configured to simulate fault injection scenarios by injecting (e.g., intentionally injecting or inserting) different faults into network infrastructures and monitoring performance (e.g., attributes of data transmission and/or outputs) of the network infrastructure under the injected faults. In some cases, the analytics server can monitor the performance of network infrastructures during the simulations. The analytics server can transmit instructions to the fault injection server in a message that includes identifications of the selected one or more selected faults. The fault injection server can receive the instructions and identify the identifications of the one or more selected faults. The fault injection server can retrieve the code that corresponds to the selected faults based on the identifications. The fault injection server can execute the code to inject the faults into the network infrastructure. Thus, the fault injection server can execute a fault injection scenario to simulate performance of the network infrastructure operating under the selected one or more faults.

The fault injection server or the analytics server can determine different performance indicators (e.g., attributes of the network infrastructure such as latency and other attributes, as discussed above) based on the monitored data. For example, the fault injection server or analytics server can collect data packets and measure processing speeds of the different network computer nodes during the fault injection scenario. The fault injection server or the analytics server can determine different attributes (e.g., latency, round-trip time, bit rate, error rate, etc.) or characteristics of the data transmission or processing in the same manner as described above. The determined attributes or characteristics can be performance indicators. The fault injection server can transmit such attributes or characteristics to the analytics server in cases in which the fault injection server performs such processing.

The analytics server can transmit the monitored data and/or the performance indicators to the client device. The client device can receive and present the monitored data and/or performance indicators on a user interface. In some cases, the analytics server can store the performance indicators. The analytics server can use the performance indicators as input into the computer model upon receiving a second request from the client device or a different client device for a recommendation for a fault scenario to run to test the same network infrastructure for vulnerabilities.

In some cases, the analytics server can automatically instruct the fault injection server to execute a fault injection scenario (e.g., a second fault injection scenario). In doing so, the analytics server can perform the method 200 skipping from the step 220 to the step 240, as depicted by an arrow 250. The analytics server can automatically instruct the fault injection server or instruct the fault injection server responsive to a user input depending on the configuration of the analytics server. For example, the analytics server can monitor outputs (e.g., second outputs) generated by the network infrastructure and attributes (e.g., second attributes) of data communication between the set of network component nodes. The analytics server can identify the dependency protocol of the network infrastructure as described above. The analytics server can execute the computer model using the dependency protocol of network infrastructure, the monitored second attributes, and the monitored second outputs as input. In doing so, the analytics server can cause the computer model to output or predict a second set of faults. Responsive to predicting the second set of faults, the analytics server can automatically (e.g., without any further user input) instruct the fault injection server to execute a second fault injection scenario simulating performance of the network infrastructure operating under the second set of faults.

In a non-limiting example, the analytics server can perform the systems and methods described herein to detect vulnerabilities for a service running on a cluster of computing devices (e.g., a Kubernetes cluster), such as vulnerabilities for targeting the cluster's container infrastructure. For example, the analytics server can receive a request for a recommendation for a fault injection scenario for a cluster of computing devices. The analytics server can monitor the cluster of computing devices and determine a high criticality value for a database management system (e.g., a MongoDB) of the cluster of computing devices as well as other attributes, criticality values, outputs, and/or dependencies or relationships within the cluster of computing devices. In some cases, the analytics server can receive configuration data or manually input attributes, criticality values, outputs, and/or dependencies or relationships within the cluster of computing devices from the computing device that transmitted the request. The analytics server can retrieve historical request data, if any (e.g., responsive to determining the historical request data is available), for the cluster of computing devices. The analytics server can input any combination of such data into the computer model and execute the computer model. The computer model can output a set of identifications of faults and/or fault characteristics of the faults. The analytics server can transmit the set of identifications of faults to the requesting computing device.

The analytics server can receive a selection of the set of identifications of faults and instruct a fault injection server to simulate the faults corresponding to the selected identifications at the cluster of computing devices in a fault injection scenario. The analytics server can determine and transmit any performance indicators of the cluster of computing devices to the computing device to present the performance indicators at the computing device. In this way, the analytics server can automatically and more quickly recommend a more complete and relevant set of tests or faults for different services that are hosted by different network infrastructures, allowing for a chaos infrastructure to be used on a larger scale and to be more accurate.

FIGS. 3-10 illustrate example user interfaces 300-1000 for simulating fault injections into a network infrastructure, according to an embodiment. The user interfaces 300-1000 respectfully illustrate different faults (configurations of faults) that can be injected into a cluster of computing devices or a network infrastructure hosting a service or application using the systems and methods described herein, such as the system 100 and the method 200. The user interfaces 300-1000 can be or include editable user interfaces through which a user can edit different fault characteristics of faults. In some cases, the user interfaces 300-1000 may have been auto-populated with fault characteristics by an analytics server that were output by a computer model as described herein. The analytics server may transmit such user interfaces to a client device responsive to receiving output fault recommendations from the computer model.

The user interface 300 illustrates an example replica failure fault configuration. In the user interface 300, a taxengine service can be identified for targeting by a fault. A replica failure fault configuration may cause a fault injection server, as described herein, to terminate one random (or pseudo-random) pod (e.g., network component node) of a cluster with a Kubernetes termination grace period (e.g., a default Kubernetes termination grace period) of 30 seconds or for any duration. The replica failure fault can be monitored by analyzing the latency of traffic routed to different servers of the cluster. Terminating a small number of replicas properly should not cause any spike in latency or errors because traffic can be routed to the remaining pool of healthy servers. However, if the termination is improper, there may be a spike in error rate for requests serviced by the terminated pod. The latency can be monitored to determine whether the replica system of the cluster is working properly in case a node of the cluster ever goes down.

The user interface 300 can include forms 302-324. Each of the forms 302-324 can be or include one or more fields into which values can be added, one or more selectable buttons, one or more dropdowns, etc. Values can be added automatically, such as by the analytics server, upon determining a fault and fault characteristics of the fault, or manually by a user accessing the user interface 300. The user accessing the user interface 300 can remove or update the values in the fields. For example, the user interface 300 can include a fault type drop-down menu 302, a service field 304, a namespace field 306, a cluster drop-down menu 308, a resource type field 310, a label key field 312, a label value field 314, an add label button 316, a pods percentage field 318, a pods count field 320, a termination grace period field 322, and an impact type drop-down menu 324.

A user accessing the user interface 300 can select a fault type from the fault type drop-down menu 302. Selection of different fault types can cause the user interface 300 to toggle between different views of different faults, in some cases faults recommended by the analytics server, as well as the fault characteristics of the respective faults. For instance, upon selection of a "pod killer fault," the user interface 300 can include the forms 302-324 with the values associated with the forms 302-324. The service field 304 can allow a user to select a service into which to inject a fault. Clusters of computing devices can run or host different services, so the service field 304 can allow a user to select which of the services to target with the fault. The namespace field 306 can allow a user to select a namespace (e.g., a sub-cluster of computing devices or nodes of the cluster of computing devices) into which to inject the fault. The cluster drop-down menu 308 can allow a user to select which cluster to impact with the fault. The resource type field 310 can allow a user to select a type of resource to target with the fault. The label key field 312 and the label value field 314 together form fields of a key-value pair that identifies a service to target with the fault. A value in the label key field 312 can be or include a K8s (e.g., a Kubernetes cluster) label key (e.g., a label that identifies a service hosted by the K8s cluster). A value in the label value field 314 can be or include a K8s label value (e.g., identify a subset of nodes of the K8s cluster that host or perform the service). Values from the label key field 312 and the label value field 314 together can be used by the fault injection server to identify which computing devices of a cluster to inject or impact with the fault. A user can select the add label button 316 to add further labels or key-value pairs. The pods percentage field 318 can allow a user to indicate a percentage of pods to target (e.g., randomly target) with a fault. The pods count field 320 can allow a user to indicate a number of pods to target (e.g., randomly target or pseudo-randomly target) with the fault. The termination grace period field 322 can indicate a time period for a pod to be terminated properly before sending a kill signal "SIGKILL" message to the pod. The impact type drop-down menu 324 can allow a user to select an impact of the fault. An impact may be an operation or what the fault causes to happen in the cluster into which the fault is injected.

As depicted in the user interface 300, the pod killer fault can be selected from the fault type drop-down menu 302. The fault characteristics of the pod killer fault are depicted in the forms 304-322. For instance, the service field 304 can indicate that the pod killer fault can impact a "taxengine" service of a cluster. The namespace field 306 can indicate that the pod killer fault can impact a horizontax namespace of the cluster. The cluster drop-down menu 308 can indicate that the pod killer fault can impact a northwest cluster. The resource type field 310 can indicate that the pod killer fault can impact a pod resource type (e.g., the availability of the pod). The key-value pair fields 312 and 314 can indicate that the pod killer fault can impact computing devices of the clusters that have been labeled with the taxengine service of the cluster. The pods count field 320 can indicate only one pod is to be targeted with the fault. The termination grace period field 322 can indicate the time period for the targeted pod of the fault to be terminated properly (e.g., gracefully) in 30 seconds. The impact type drop-down menu 324 can indicate the action of the fault is to shut down the impacted or targeted pod.

The user interface 400 illustrates an example cold start fault configuration. In the user interface 400, all replicas of a cluster can be targeted. A cold start fault configuration may cause a fault injection server, as described herein, to terminate all of a service's replicas at once. Doing so should cause a period of unavailability followed by a recovery. The length of the period of unavailability and recovery can be monitored to determine whether the cluster is configured properly to handle a cold start fault configuration.

The user interface 400 can include forms 402-432. Each of the forms 402-432 can be or include one or more fields into which values can be added, one or more selectable buttons, one or more dropdowns, etc. Values can be added automatically, such as by the analytics server, upon determining a fault and fault characteristics of the fault, or manually by a user accessing the user interface 400. The user accessing the user interface 400 can remove or update the values in the fields. For example, the user interface 400 can include a fault type drop-down menu 402, a service field 404, a namespace field 406, a cluster drop-down menu 408, a resource type field 410, a first label key field 412, a first label value field 414, a second label key field 416, a second label value field 418, a third label key field 420, a third label value field 422, an add label button 424, a pods percentage field 426, a pods count field 428, a termination grace period field 430, and an impact type drop-down menu 432.

The forms 402-414 and 424-432 can be configured to indicate or include values for the same characteristics as the forms 302-324 of the user interface 300. However, the second label key field 416, the second label value field 418, the third label key field 420, and the third label value field 422 can be forms for additional fields for additional key-value pairs. The fault may impact nodes of the cluster that have been labeled with values in each of the label value fields 414, 418, and 420.

As depicted in the user interface 400, a pod killer fault was selected from the fault type drop-down menu 402. The fault characteristics of the pod killer fault are depicted in the forms 402-432. The fault characteristics depicted in the user interface 400 can be the same as the fault characteristics depicted in the user interface 300. However, the fault characteristics in the user interface 400 can include the further labels in the second label key field 416 of "app," the second label value field 418 of "taxengine-srv," the third label key field 420 of "role," and the third label value field 422 of "taxengine." A fault injection server implementing the pod killer fault may only target nodes that have been labeled with the values in the forms 412-422 when injecting a fault into the cluster. Additionally, to simulate the cold start fault, there is a value in the pods percentage field 426 of 100 to indicate that each pod that matches the values in the forms 412-422 will be impacted by the fault of the shutting down any impacted or targeted pod.

The user interface 500 illustrates an example bad deployment fault configuration. In the user interface 500, all service traffic can be targeted. The service traffic can be targeted for five minutes or for any duration. In the bad deployment fault configuration, nodes can be deployed with success rate detectors to minimize the impact of errant code. If the success rate decreases, the deployment can be automatically rolled back. The cluster can be monitored to determine performance indicators for the cluster based on the bad deployment fault.

The user interface 500 can include forms 502-536. Each of the forms 502-536 can be or include one or more fields into which values can be added, one or more selectable buttons, one or more dropdowns, etc. Values can be added automatically, such as by the analytics server, upon determining a fault and fault characteristics of the fault, or manually by a user accessing the user interface 500. The user accessing the user interface 500 can remove or update the values in the fields. For example, the user interface 500 can include a fault type drop-down menu 502, a service field 504, a namespace field 506, a cluster drop-down menu 508, a resource type field 510, a first label key field 512, a first label value field 514, a second label key field 516, a second label value field 518, an add label button 520, a pods percentage field 522, a pods count field 524, a command type drop-down menu 526, a hostnames field 528, an IP address field 530, a remote ports field 532, a local ports field 534, and a duration field 536.

A user accessing the user interface 500 can select a fault type from the fault type drop-down menu 502. Selection of different fault types can cause the user interface 500 to toggle between different views of different faults, in some cases faults recommended by the analytics server, as well as the fault characteristics of the respective faults. For instance, upon selection of a "host fault," the user interface 500 can include the forms 502-536 with the values associated with the forms 502-536. The forms 502-536 can be configured to hold values of the same types of data as the forms 302-320 of the user interface 300. The command type drop-down menu 526 can allow a user to indicate an impact or effect of the fault. The hostnames field 528 can allow a user to indicate which hostnames to impact with the fault. The IP address field 530 can allow a user to indicate which IP addresses to impact with the fault. The remote ports field 532 can allow a user to indicate which remote ports to impact with the fault. The local ports field 534 can allow a user to indicate which local ports to impact with the fault. The duration field 536 can allow a user to indicate a length of the fault (e.g., in seconds).

As depicted in the user interface 500, the host fault can be selected from the fault type drop-down menu 502. The fault characteristics of the host fault are depicted in the forms 504-536. For instance, the service field 504 can indicate that the host fault can impact a "horizon-litmus-elected" service of a cluster. The namespace field 506 can indicate that the host fault can impact a hznlitmusbox namespace of the cluster. The cluster drop-down menu 508 can indicate that the host fault can impact a northwest cluster. The resource type field 510 can indicate that the host fault can impact a deployment resource type. The key-value pair fields 512-518 can indicate that the host fault can impact computing devices of the cluster that have been labeled with the horizon-litmus-elected service and the rpc_server labels. The pods percentage field 522 can indicate that 100% of the pods that have the labels of the key-value pair fields 512-518 will be impacted by the fault. The command type drop-down menu 526 can indicate that a "blackhole" command type has been selected. The specified command causes a particular action associated with the fault to be injected. Only the local ports field 534 can include a value of the fields 528-534 and indicate for the fault to impact outgoing traffic from the "31002" port. The duration field 536 can indicate that the fault will last 300 seconds, or five minutes. The termination grace period field 522 can indicate the time period for the targeted pod of the fault to be terminated properly (e.g., gracefully) is 30 seconds. The command type drop-down menu 526 can indicate the action of the fault is to shut down (e.g., blackhole) the impacted or targeted pod.

The user interface 600 illustrates an example validate auto-scaling fault configuration. In the validate auto-scaling fault, resource contention can be injected (e.g., by the fault injection server) into a service's pods (e.g., network component nodes). For example, 80% or any percentage of central processing unit usage can be injected into all matching server pods. The usage can target one central processing unit core. The injection can last for five minutes or for any length of time. In some cases, the injection can last across multiple stages, such as scaling the injected central processing unit percentage over time (e.g., from 10% to 50% to 80%). The cluster can be monitored to determine performance indicators for the cluster based on the auto-scaling fault.

The user interface 600 can include forms 602-636. Each of the forms 602-636 can be or include one or more fields into which values can be added, one or more selectable buttons, one or more dropdowns, etc. Values can be added automatically, such as by the analytics server, upon determining a fault and fault characteristics of the fault, or manually by a user accessing the user interface 600. The user accessing the user interface 600 can remove or update the values in the fields. For example, the user interface 600 can include a fault type drop-down menu 602, a service field 604, a namespace field 606, a cluster drop-down menu 608, a resource type field 610, a first label key field 612, a first label value field 614, a second label key field 616, a second label value field 618, an add label button 620, a pods percentage field 622, a pods count field 624, a command type drop-down menu 626, a duration field 628, a CPU percentage field 630, a cores field 632, an all cores selectable option 634, and a containers drop-down menu 636.

A user accessing the user interface 600 can select a fault type from the fault type drop-down menu 602. Selection of different fault types can cause the user interface 600 to toggle between different views of different faults, in some cases faults recommended by the analytics server, as well as the fault characteristics of the respective faults. For instance, upon selection of a "host fault," the user interface 600 can include the forms 602-636 with the values associated with the forms 602-636. The forms 602-636 can be configured to hold values of the same types of data as the forms 502-526 of the user interface 500. The duration field 628 can allow a user to indicate a length of the fault (e.g., in seconds). The CPU percentage field 630 can allow a user to indicate a percentage of the CPU to consume on each core. The cores field 632 can indicate a number of CPU cores to attack with the fault. The all cores selectable option 634 can allow a user to select an option to inject a fault into all of the cores of the nodes impacted by the fault. The containers drop-down menu 636 can allow a user to select which containers to target with the fault.

As depicted in the user interface 600, the host fault was selected from the fault type drop-down menu 602. The fault characteristics of the host fault are depicted in the forms 604-636. For instance, the service field 604 can indicate that the host fault can impact a "horizon-litmus-elected" service of a cluster. The namespace field 606 can indicate that the host fault can impact a hznlitmusbox namespace of the cluster. The cluster drop-down menu 608 can indicate that the host fault can impact a northwest cluster. The resource type field 610 can indicate that the host fault can impact a deployment resource type. The key-value pair fields 612-618 can indicate that the host fault can impact computing devices of the cluster that have been labeled with the horizon-litmus-elected service and the rpc_server labels. The pods percentage field 622 can indicate that 100% of the pods that have the labels of the key-value pair fields 612-618 will be impacted by the fault. The command type drop-down menu 626 can indicate that a "CPU" command type has been selected. The CPU command can indicate that the fault is to cause specific cores to use a specific percentage of resources. The duration field 628 can indicate that the fault will last 300 seconds, or five minutes. The CPU percentage field 630 can indicate the percentage of the CPU to consume at each core. The cores field 632 can indicate to only affect one core with the fault. The containers drop-down menu 636 can indicate to affect all containers in the selected pods or a subset of the containers in the selected pods.

The user interface 700 illustrates an example validate detectors and alerts fault configuration. The validate detectors and alerts fault can be an application layer (layer 7) request-based fault. For example, a gRPC error "UNAVAILABLE" can be injected into a defined percentage (e.g., 100%) of service calls from a server, such as a Horizon RPC server. The cluster can be monitored to determine performance indicators for the cluster based on the auto-scaling fault configuration. In some cases, the cluster can be monitored to determine if detectors fire when the detectors are expected to and that alerts will go to the correct destinations.

The user interface 700 can include forms 702-736. Each of the forms 702-736 can be or include one or more fields into which values can be added, one or more selectable buttons, one or more dropdowns, etc. Values can be added automatically, such as by the analytics server, upon determining a fault and fault characteristics of the fault, or manually by a user accessing the user interface 700. The user accessing the user interface 700 can remove or update the values in the fields. For example, the user interface 700 can include a fault type drop-down menu 702, a service drop-down menu 704, a destination consul field 706, an all destinations selectable button 708, a container name field 712, a container operation field 714, a business application programming interface (Bapi) API name field 716, a destination field 718, a merchant token field 720, a cell identifier field 722, an impact percentage field 724, a fault duration field 726, a dry run selectable button 728, an inject latency field 730, an inject error code drop-down menu 732, an inject latency field 734, and an inject error code field 736.

A user accessing the user interface 700 can select a fault type from the fault type drop-down menu 702. Selection of different fault types can cause the user interface 700 to toggle between different views of different faults, in some cases faults recommended by the analytics server, as well as the fault characteristics of the respective faults. For instance, upon selection of a "request fault," the user interface 700 can include the forms 702-736 with the values associated with the forms 702-736. The service drop-down menu 704 can allow a user to select a service into which to inject a fault. The destination consul field 706 can allow a user to indicate the consul service receiving the request of the fault. The all destinations selectable button 708 can give a user to select an option to target every destination consul associated with the service indicated in the service drop-down menu. The container name field 712 can allow a user to select a source container for the fault. The container operation field 714 can allow a user to input an operation to perform on the container indicated in the container name field 712. The Bapi API name field 716 can allow a user to input a Bapi value that identifies a Bapi of the cluster. The destination field 718 can allow a user to input a destination of traffic from the container identified in the container name field 712 to impact with the fault. The merchant token field 720 can allow a user to input an identifier of a merchant to be impacted by the fault (e.g., impact traffic going to servers or computing devices of a merchant). The cell identifier field 722 can allow a user to input a cell to impacted by the fault (e.g., computing devices of the cluster located in a specific geographic location receiving or transmitting the network traffic impacted by the fault). The impact percentage field 724 can allow a user to input a percentage of requests to be impacted by the fault. The fault duration field 726 can allow a user to input a duration of the fault. The dry run selectable button 728 can allow a user to select an option to not add any latency or error codes, but just to log how the cluster is operating without the fault. The inject latency field 730 can allow a user to input an amount of gRPC latency to inject into the cluster. The inject error code drop-down menu 732 can allow a user to select an error code to inject into the cluster. The inject latency field 734 can allow a user to input an amount of HTTP latency into the cluster. The inject error code field 736 can allow a user to input an HTTP error code to insert into the cluster.

As depicted in the user interface 700, the request fault can be selected from the fault type drop-down menu 702. The fault characteristics of the request fault are depicted in the forms 704-736. For instance, the service drop-down menu 704 can indicate that the request fault can impact a "rpp-testing" service of a cluster that is making requests. The all destinations selectable button 708 can indicate that the fault will impact the requests that the rtt-testing service's requests to all destinations. The impact percentage field 724 can indicate that the fault will impact 100% of requests by the rpp-testing-rpc-service. The fault duration field 726 can indicate that the fault will have a duration of 120,000 seconds, or 2,000 minutes. The inject error code drop-down menu 732 can indicate that the fault will inject an UNAVAILABLE error code into requests by the rpp-testing-rpc-service.

The user interface 800 illustrates an example service dependency unavailable fault configuration. The service dependency unavailable fault can be an application layer (layer 7) request-based fault. For example, a gRPC error "UNAVAILABLE" can be injected into a defined percentage (e.g., 100%) of service calls from a server, such as a Horizon RPC server, to a database, such as a MongoDB. The cluster can be monitored to determine performance indicators for the cluster based on the service dependency unavailable fault configuration. In some cases, the cluster can be monitored to determine how a service responds if one of the service's dependencies is unavailable, such as a critical dependency.

The user interface 800 can include forms 802-836. Each of the forms 802-836 can be or include one or more fields into which values can be added, one or more selectable buttons, one or more dropdowns, etc. Values can be added automatically, such as by the analytics server, upon determining a fault and fault characteristics of the fault, or manually by a user accessing the user interface 800. The user accessing the user interface 800 can remove or update the values in the fields. The forms 802-836 can be configured to receive the values and types of data or selections as the forms 702-736 of the user interface 700. For example, the user interface 800 can include a fault type drop-down menu 802, a service drop-down menu 804, a destination consul field 806, an all destinations selectable button 808, a container name field 812, a horizon op field 814, a Bapi API name field 816, a destination field 818, a merchant token field 820, a cell identifier field 822, an impact percentage field 824, a fault duration field 826, a dry run selectable button 828, an inject latency field 830, an inject error code drop-down menu 832, an inject latency field 834, and an inject error code field 836.

As depicted in the user interface 800, the request fault can be selected from the fault type drop-down menu 802. The fault characteristics of the request fault are depicted in the forms 804-836. The forms 804-836 can include the same values as the forms 702-736 of the user interface 700, except the destination consul field 806 can limit the fault to only impact requests from the rpp-testing service to an mproxy-grpc consul service. The fault injection server implementing the fault of the user interface 800 can inject an UNAVAILABLE error code into 100% of the requests by the rpp-testing service to the mproxy-grpc consul service. The fault injection server can do so for 120,000 seconds.

The user interface 900 illustrates an example service dependency latency fault configuration. The service dependency unavailable fault can be an application layer (layer 7) request-based fault and/or an infra/transport layer (layer 4) fault. For example, a defined amount of latency (e.g., 100 milliseconds) can be added to requests made to a database (e.g., a MongoDB). The cluster can be monitored to determine performance indicators for the cluster based on the service dependency latency fault.

The user interface 900 can include forms 902-936. Each of the forms 902-936 can be or include one or more fields into which values can be added, one or more selectable buttons, one or more dropdowns, etc. Values can be added automatically, such as by the analytics server, upon determining a fault and fault characteristics of the fault, or manually by a user accessing the user interface 900. The user accessing the user interface 900 can remove or update the values in the fields. The forms 902-936 can be configured to receive the values and types of data or selections as the forms 702-736 of the user interface 700. For example, the user interface 900 can include a fault type drop-down menu 902, a service drop-down menu 904, a destination consul field 906, an all destinations selectable button 908, a container name field 912, a horizon op field 914, a Bapi API name field 916, a destination field 918, a merchant token field 920, a cell identifier field 922, an impact percentage field 924, a fault duration field 926, a dry run selectable button 928, an inject latency field 930, an inject error code drop-down menu 932, an inject latency field 934, and an inject error code field 936.

As depicted in the user interface 900, the request fault can be selected from the fault type drop-down menu 902. The fault characteristics of the request fault are depicted in the forms 904-936. The forms 904-936 can include the same values as the forms 802-836 of the user interface 800, except instead of the inject error code drop-down menu 932 indicating to inject an UNAVAILABLE error code into requests, the inject latency field 930 indicates to inject 100 milliseconds of latency into the requests by the rpp-testing service to the mproxy-grpc consul service.

The user interface 1000 illustrates an example service unavailable fault configuration. The service dependency unavailable fault can be an infra/transport layer (layer 4) fault. In the service unavailable fault, all traffic can be stopped (e.g., blackholed) to cause the service to be unavailable to a consumer. The cluster can be monitored to determine performance indicators for the cluster based on the service unavailable fault.

The user interface 1000 can include forms 1002-1036. Each of the forms 1002-1036 can be or include one or more fields into which values can be added, one or more selectable buttons, one or more dropdowns, etc. Values can be added automatically, such as by the analytics server, upon determining a fault and fault characteristics of the fault, or manually by a user accessing the user interface 1000. The user accessing the user interface 1000 can remove or update the values in the fields. For example, the user interface 1000 can include a fault type drop-down menu 1002, a service field 1004, a namespace field 1006, a cluster drop-down menu 1008, a resource type field 1010, a first label key field 1012, a first label value field 1014, a second label key field 1016, a second label value field 1018, an add label button 1020, a pods percentage field 1022, a pods count field 1024, a command type drop-down menu 1026, a hostnames field 1028, an IP address field 1030, a remote ports field 1032, a local ports field 1034, and a duration field 1036.

A user accessing the user interface 1000 can select a fault type from the fault type drop-down menu 1002. Selection of different fault types can cause the user interface 1000 to toggle between different views of different faults, in some cases faults recommended by the analytics server, as well as the fault characteristics of the respective faults. For instance, upon selection of a "host fault," the user interface 1000 can include the forms 1002-1036 with the values associated with the forms 1002-1036. The forms 1002-1036 can be configured to hold values of the same types of data as the forms 302-320 of the user interface 300. The command type drop-down menu 1026 can allow a user to indicate an impact or effect of the fault. The hostnames field 1028 can allow a user to indicate which hostnames to impact with the fault. The IP address field 1030 can allow a user to indicate which IP addresses to impact with the fault. The remote ports field 1032 can allow a user to indicate which remote ports to impact with the fault. The local ports field 1034 can allow a user to indicate which local ports to impact with the fault. The duration field 1036 can allow a user to indicate a length of the fault (e.g., in seconds).

As depicted in the user interface 1000, the host fault was selected from the fault type drop-down menu 1002. The fault characteristics of the host fault are depicted in the forms 1004-1036. For instance, the service field 1004 can indicate that the host fault can impact a "horizon-litmus-elected" service of a cluster. The namespace field 1006 can indicate that the host fault can impact a hznlitmusbox namespace of the cluster. The cluster drop-down menu 1008 can indicate that the host fault can impact a northwest cluster. The resource type field 1010 can indicate that the host fault can impact a deployment resource type. The key-value pair fields 1012-1018 can indicate that the host fault can impact computing devices of the cluster that have been labeled with the horizon-litmus-elected service and the rpc_server labels. The pods percentage field 1022 can indicate that 100% of the pods that have the labels of the key-value pair fields 1012-1018 will be impacted by the fault. The command type drop-down menu 1026 can indicate that a "blackhole" command type has been selected. Only the local ports field 1034 can include a value of the fields 1028-1034 and indicate for the fault to impact outgoing traffic from the "31002" port. The duration field 1036 can indicate that the fault will last 300 seconds, or five minutes, only one pod is to be targeted with the fault. The termination grace period field 1022 can indicate the time period for the targeted pod of the fault to be terminated properly (e.g., gracefully) is 30 seconds. The command type drop-down menu 1026 can indicate the action of the fault is to shut down the impacted or targeted pod.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system comprising:
a network infrastructure having a set of network component nodes, each network component node configured to communicate with at least one other network component node in accordance with a dependency protocol indicating relationships between the set of network component nodes; and
a server in communication with the network infrastructure and a fault injection server, the server configured to:
monitor outputs generated by the network infrastructure, and monitor attributes of data communication between the set of network component nodes;
execute a machine learning model using the dependency protocol, the monitored attributes, and the monitored outputs as input to predict a set of faults;
in response to presenting the set of faults for display on a user interface, receive a selection of one or more of the set of faults; and
instruct the fault injection server to execute a fault injection scenario simulating performance of the network infrastructure operating under the selected one or more faults.

2. The system of claim 1, wherein the attributes of the data communication between the set of network component nodes correspond to at least one of a number of abstraction layers, whether the network infrastructure is a micro or macro service, an attribute of a single-point-of-failure associated with the network infrastructure, a network data packet loss, or a number of network component nodes within the network infrastructure.

3. The system of claim 1, wherein at least one of the set of network component nodes is a database or an application programming interface.

4. The system of claim 1, wherein the set of faults corresponds to at least one of a communication latency, communication duration, communication cadence, or a communication timing.

5. The system of claim 1, wherein the set of faults corresponds to a criticality value of at least one network component node within the network infrastructure.

6. The system of claim 1, wherein the computer model is trained using a training dataset corresponding to monitored data associated with training network infrastructures.

7. The system of claim 1, wherein the server is configured to:
present, at a client device, a user interface comprising one or more forms for inputting one or more configurations of the network infrastructure; and
receive, from the client device, a first set of configurations input into the one or more forms, wherein the server is configured to execute the computer model by further using the first set of configurations as input.

8. The system of claim 1, wherein the server is configured to:
retrieve historical request data for the network infrastructure from memory, the historical request data comprising data indicating performance of the network infrastructure under one or more prior tests,
wherein executing the computer model comprises further using the historical request data as input.

9. The system of claim 1, wherein the set of faults comprises injecting latency into communication with a database.

10. The system of claim 1, wherein the set of faults comprises deactivating a leader network component node of the set of network component nodes.

11. The system of claim 1, wherein the server is configured to:
monitor second outputs generated by the network infrastructure and second attributes of data communication between the set of network component nodes;
execute the computer model using the dependency protocol, the monitored second attributes, and the monitored second outputs as input to predict a second set of faults; and
responsive to predicting the second set of faults, automatically instruct the fault injection server to execute a second fault injection scenario simulating performance of the network infrastructure operating under the second set of faults.

12. The system of claim 1, wherein the set of faults corresponds to at least one of an unexpected termination, exceptions, general failures, or communication errors.

13. The system of claim 1, wherein the set of faults corresponds to artificially injecting an error into the network infrastructure.

14. A method comprising:
monitoring, by a server in communication with a fault injection server and a network infrastructure having a set of network component nodes, outputs generated by the network infrastructure, and monitoring attributes of data communication between network component nodes of the set of network component nodes, each network component node configured to communicate with at least one other network component node in accordance with a dependency protocol indicating relationships between the set of network component nodes;
executing, by the server, a machine learning model using the dependency protocol, the monitored attributes, and the monitored outputs as input to predict a set of faults;
in response to presenting the set of faults for display on a user interface, receiving, by the server, a selection of one or more of the set of faults; and
instructing, by the server, the fault injection server to execute a fault injection scenario simulating performance of the network infrastructure operating under the selected one or more faults.

15. The method of claim 14, wherein the attributes of the data communication between the set of network component nodes correspond to at least one of a number of abstraction layers, whether the network infrastructure is a micro or macro service, an attribute of a single-point-of-failure associated with the network infrastructure, a network data packet loss, or a number of network component nodes within the network infrastructure.

16. The method of claim 14, wherein at least one of the set of network component nodes is a database or an application programming interface.

17. The method of claim 14, wherein the set of faults corresponds to at least one of a communication latency, communication duration, communication cadence, or a communication timing.

18. The method of claim 14, wherein the set of faults corresponds to a criticality value of at least one network component node within the network infrastructure.

19. The method of claim 14, wherein the computer model is trained using a training dataset corresponding to monitored data associated with training network infrastructures.

20. The method of claim 14, further comprising:
presenting, by the server at a client device, a user interface comprising one or more forms for inputting one or more configurations of the network infrastructure; and
receiving, by the server from the client device, a first set of configurations input into the one or more forms,
wherein executing the computer model comprises further using, by the server, the first set of configurations as input.

* * * * *